United States Patent
Lei

(10) Patent No.: US 9,979,976 B2
(45) Date of Patent: May 22, 2018

(54) LIGHT-WEIGHT VIDEO CODING SYSTEM AND DECODER FOR LIGHT-WEIGHT VIDEO CODING SYSTEM

(71) Applicant: NATIONAL KAOHSIUNG FIRST UNIVERSITY OF SCIENCE AND TECHNOLOGY, Kaohsiung (TW)

(72) Inventor: Chih-Wei Lei, Kaohsiung (TW)

(73) Assignee: NATIONAL KAOHSIUNG FIRST UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 272 days.

(21) Appl. No.: 14/734,212

(22) Filed: Jun. 9, 2015

(65) Prior Publication Data
US 2016/0165258 A1   Jun. 9, 2016

(30) Foreign Application Priority Data
Dec. 9, 2014   (TW) .............................. 103142905 A

(51) Int. Cl.
H04N 19/30 (2014.01)

(52) U.S. Cl.
CPC ........... *H04N 19/395* (2014.11); *H04N 19/30* (2014.11)

(58) Field of Classification Search
CPC .............................. H04N 19/395; H04N 19/19
(Continued)

(56) References Cited

U.S. PATENT DOCUMENTS

| 2006/0153301 A1* | 7/2006 | Guleryuz | ............. | H04N 19/159 |
| | | | | 375/240.16 |
| 2007/0086520 A1* | 4/2007 | Kim | ..................... | H04N 19/105 |
| | | | | 375/240.1 |

(Continued)

FOREIGN PATENT DOCUMENTS

| TW | 201143370 A1 | 12/2011 |
| TW | 201332339 A | 8/2013 |

OTHER PUBLICATIONS

Ted Chih-Wei Lei et al., A H.264/AVC Based Distributed Video Coding Paradigm with Mode Decision at Decoder, 2014 International Symposium on Computer, Consumer and Control, IEEE, pp. 525-528.

(Continued)

*Primary Examiner* — Jay Patel
*Assistant Examiner* — Marnie Matt
(74) *Attorney, Agent, or Firm* — WPAT, P.C.; Anthony King

(57) ABSTRACT

The disclosure provides a Light-weight Video Coding system and a decoder for a Light-weight Video Coding system. The decoder includes: a mode decision module and a motion estimation module. The mode decision module, which adopts four flexible types of mode decision, is used for selecting a mode. And, it is used for selecting at least one predetermined block of a current frame according to the mode including plurality pixels. The motion estimation module, which adopts the Partial Boundary Matching Algorithm, is used for selecting partial neighbor pixels of left and top of the block according to the predetermined block in the current frame. And it is used for comparing with corresponding neighbor plurality pixels of left and top with a corresponding predetermined block in reference frame. It is determining whether the corresponding predetermined block (Continued)

Figure 1:
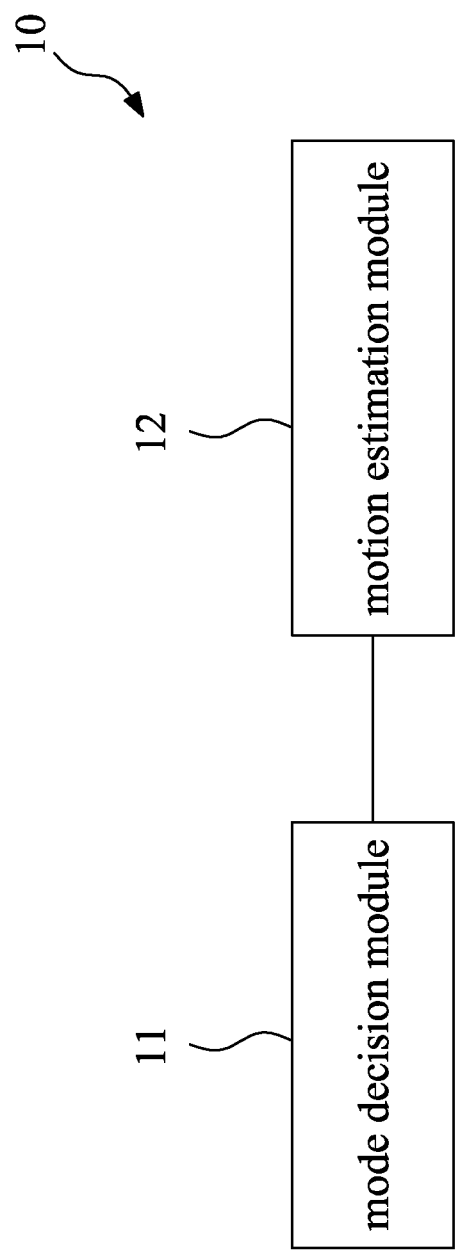

in the reference frame copies and pastes to the predetermined block in the current frame.

10 Claims, 6 Drawing Sheets

(58) Field of Classification Search
 USPC ..................................................... 375/240.16
 See application file for complete search history.

(56) References Cited

U.S. PATENT DOCUMENTS

| | | | |
|---|---|---|---|
| 2008/0019448 A1* | 1/2008 | Lee .................. | H04N 19/56 |
| | | | 375/240.16 |
| 2008/0181308 A1* | 7/2008 | Wang ................ | H04N 19/105 |
| | | | 375/240.16 |
| 2009/0122867 A1* | 5/2009 | Mauchly ............ | H04N 19/176 |
| | | | 375/240.16 |
| 2009/0147854 A1* | 6/2009 | Dane ................. | H04N 5/145 |
| | | | 375/240.16 |
| 2011/0280309 A1* | 11/2011 | Francois ............ | H04N 19/105 |
| | | | 375/240.16 |
| 2012/0147961 A1* | 6/2012 | Guo .................. | H04N 19/56 |
| | | | 375/240.16 |
| 2012/0224635 A1* | 9/2012 | Kim .................. | H04N 19/46 |
| | | | 375/240.16 |
| 2012/0320986 A1 | 12/2012 | Shimizu et al. | |
| 2013/0044804 A1* | 2/2013 | Nilsson ............. | H04N 7/50 |
| | | | 375/240.02 |
| 2013/0114735 A1* | 5/2013 | Wang ................ | H04N 19/176 |
| | | | 375/240.23 |
| 2013/0128962 A1* | 5/2013 | Rajagopalan ...... | H04N 19/172 |
| | | | 375/240.07 |
| 2013/0307929 A1 | 11/2013 | Hattori et al. | |
| 2014/0307771 A1* | 10/2014 | Hemmendorff .. | H04N 19/00206 |
| | | | 375/240.02 |
| 2014/0321544 A1* | 10/2014 | Laroche ............ | H04N 19/0003 |
| | | | 375/240.13 |
| 2015/0092855 A1* | 4/2015 | Chou ................ | H04N 19/105 |
| | | | 375/240.16 |
| 2016/0191946 A1* | 6/2016 | Zhou ................ | H04N 19/523 |
| | | | 375/240.16 |
| 2016/0227250 A1* | 8/2016 | Lee .................. | H04N 19/597 |

OTHER PUBLICATIONS

Office Action and Search Report dated Jul. 23, 2015 by Taiwan Patent Office for the corresponding TW Patent Application No. 103142905.
English translation of the Search Report dated Jul. 23, 2015 by Taiwan Patent Office for the corresponding TW Patent Application No. 103142905.
Ted Chih-Wei Lei and Tai-Ping Wan, Using Distributed Video Coding vand Decoding-Friendly Encoder Design for video in the cloud, Jul. 8, 2011.
English abstract translation of TW201332339A.
English abstract translation of TW 201143370A1.
US20120320986 corresponds to TW 201143370A1.
Notice of Allowance dated Sep. 30, 2015 by Taiwan Patent Office for the corresponding TW Patent Application No. 103142905.
Lei, Ted Chih-Wei et al., Partial Boundary Matching Algorithm and Spatio-Temporal Texture Synthesis in Distributed Video Coding.
Lei, Ted Chih-Wei et al., A Low Complexity Video Coding for Combining RFID and Video Surveillance with Padding Based DVC.
Lei, Ted Chih-Wei et al., Low Cost Wireless Video Transmission Network with Padding-based Distributed Video Coding.
Lei, Ted Chih-Wei et al., Study for Distributed Video Coding Architectures.
Lei, Ted Chih-Wei et al., Padding Block Based DVC Coding Scheme with Mutual Bi-directional Frame Coding at Decoder, 2012 IEEE International Symposium on Intelligent Signal Processing and Communication Systems (ISPACS 2012) Nov. 4-7, 2012.

* cited by examiner

LIGHT-WEIGHT VIDEO CODING SYSTEM AND DECODER FOR LIGHT-WEIGHT VIDEO CODING SYSTEM

BACKGROUND OF THE INVENTION

1. Field of the Invention

The present disclosure relates to a light-weight video coding system and a decoder for a light-weight video coding system.

2. Description of the Related Art

The conventional Distributed Video Coding system transfers the computational complexity of encoder to the decoder; thus the encoder complexity decreases low, but the decoder complexity increases by several times. Therefore, it is difficult to utilize real time system. As a result, the total performance of the conventional Distributed Video Coding system is low, and the high efficiency video cannot be performed. However, the Light-weight Video Coding system decreases encoder complexity and meanwhile decreases decoder complexity for realizing the real time system.

SUMMARY OF THE INVENTION

The present disclosure provides a light-weight video coding system. The light-weight video coding system includes an encoder and a decoder. The encoder includes: a classifier, a skip block mask module, an encoding skip block record table and an encoding module. The decoder includes: a decoding module, a decoding skip block record table, a mode decision module, a block padding module and a pixel padding module.

The classifier includes a first classifying module and a second classifying module. The first classifying module is used for obtaining at least one zero motion block, and the second classifying module is used for obtaining at least one low motion block. The skip block mask module is used for masking portion of an image information to be at least one skip block according to the at least one zero motion block and the at least one low motion block, non-masking portion of the image information is at least one non-skip block. The encoding skip block record table is used for recording the at least one skip block. The encoding module is used for encoding the at least one non-skip block to be an encoded image information.

The decoding module is used for decoding the encoded image information to be at least one non-skip block. The decoding skip block record table is used for receiving the encoding skip block record table. The mode decision module is used for selecting a mode according to the decoding skip block record table, and is used for selecting at least one predetermined block of a current frame. The predetermined block includes a plurality of pixels. The block padding module includes a zero motion vector replacement module and a motion estimation module. The zero motion vector replacement module is used for replacing the at least one zero motion block of the current frame by at least one corresponding zero motion block of a reference frame. The motion estimation module is used for selecting a plurality of neighbor pixels outside of left part and top part of the predetermined block according to the at least one low motion block and the predetermined block of the current frame, and is used for comparing with a plurality of corresponding neighbor pixels outside of left part and top part of a corresponding predetermined block of the reference frame to determine whether the corresponding predetermined block of the reference frame is copied to the predetermined block of the current frame. The pixel padding module is used for padding at least one remainder pixel of the current frame.

The present disclosure provides a decoder for a light-weight video coding system. The decoder includes: a mode decision module and a motion estimation module. The mode decision module is used for selecting a mode, and is used for selecting at least one predetermined block of a current frame according to the mode. The predetermined block includes a plurality of pixels. The motion estimation module is used for selecting a plurality of neighbor pixels outside of left part and top part of the predetermined block according to the predetermined block of the current frame, and is used for comparing with a plurality of corresponding neighbor pixels outside of left part and top part of a corresponding predetermined block of a reference frame to determine whether the corresponding predetermined block of the reference frame is copied to the predetermined block of the current frame.

The complexity of the decoder of the light-weight video coding system can greatly be reduced, and the total performance of the light-weight video coding system can be improved.

BRIEF DESCRIPTION OF THE DRAWINGS

FIG. 1 shows a schematic view of a decoder for a light-weight video coding system according to the present disclosure.

FIG. 2 shows a schematic view of each mode of a mode decision module according to the present disclosure.

FIG. 3 shows a schematic view of the comparison of a motion estimation module according to the present disclosure.

FIG. 4 shows a schematic view of an encoder of the light-weight video coding system according to the present disclosure.

FIG. 5 shows a schematic view of a decoder of the light-weight video coding system according to the present disclosure.

FIG. 6 shows a schematic view of the comparison of a spatio-temporal texture synthesis module according to the present disclosure.

DETAILED DESCRIPTION OF THE INVENTION

FIG. 1 shows a schematic view of a decoder for a light-weight video coding system according to the present disclosure. Referring to FIG. 1, in an embodiment, a decoder 10 for a light-weight video coding system of the present disclosure includes a mode decision module 11 and a motion estimation module 12.

FIG. 2 shows a schematic view of each mode of a mode decision module according to the present disclosure. Referring to FIG. 1 and FIG. 2, the mode decision module 11 is used for selecting a mode, and is used for selecting at least one predetermined block of a current frame according to the mode. The predetermined block includes a plurality of pixels. In an embodiment, the modes include mode 0, mode 1, mode 2 and mode 3. In mode 0, the predetermined block 21 is a 4×4 matrix, and includes 16 pixels. In mode 1, two predetermined blocks 22, 23 are provided, each predetermined block is a 4×2 matrix, and each predetermined block includes 8 pixels. In mode 2, two predetermined blocks 24, 25 are provided, each predetermined block is a 2×4 matrix, and each predetermined block includes 8 pixels. In mode 3, four predetermined blocks 26, 27, 28, 29 are provided, each predetermined block is a 2×2 matrix, and each predetermined block includes 4 pixels. According to the required complexity and resolution, the mode decision module 11 can flexibly determine different mode.

Figure 2:
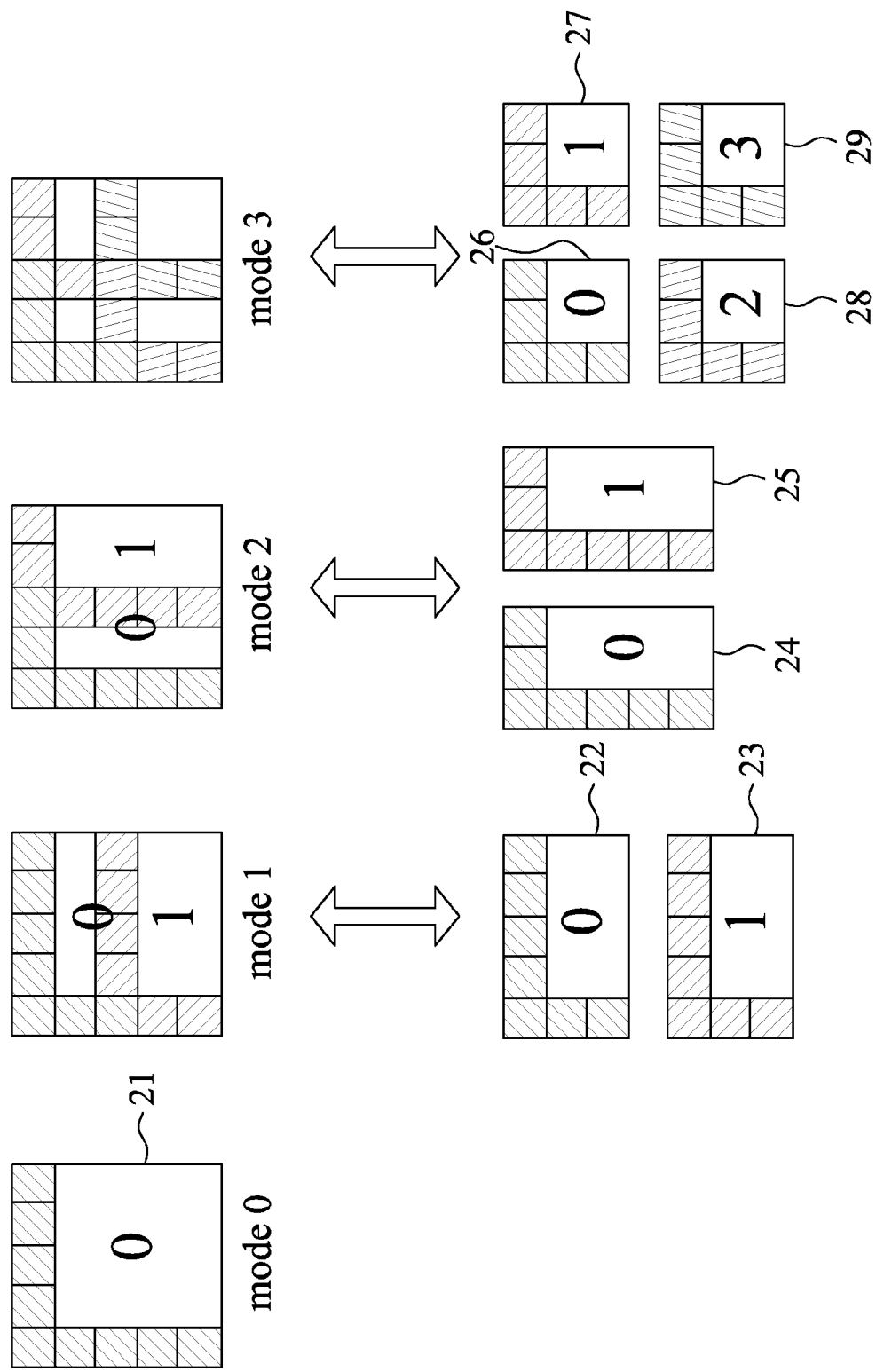
Figure 3:
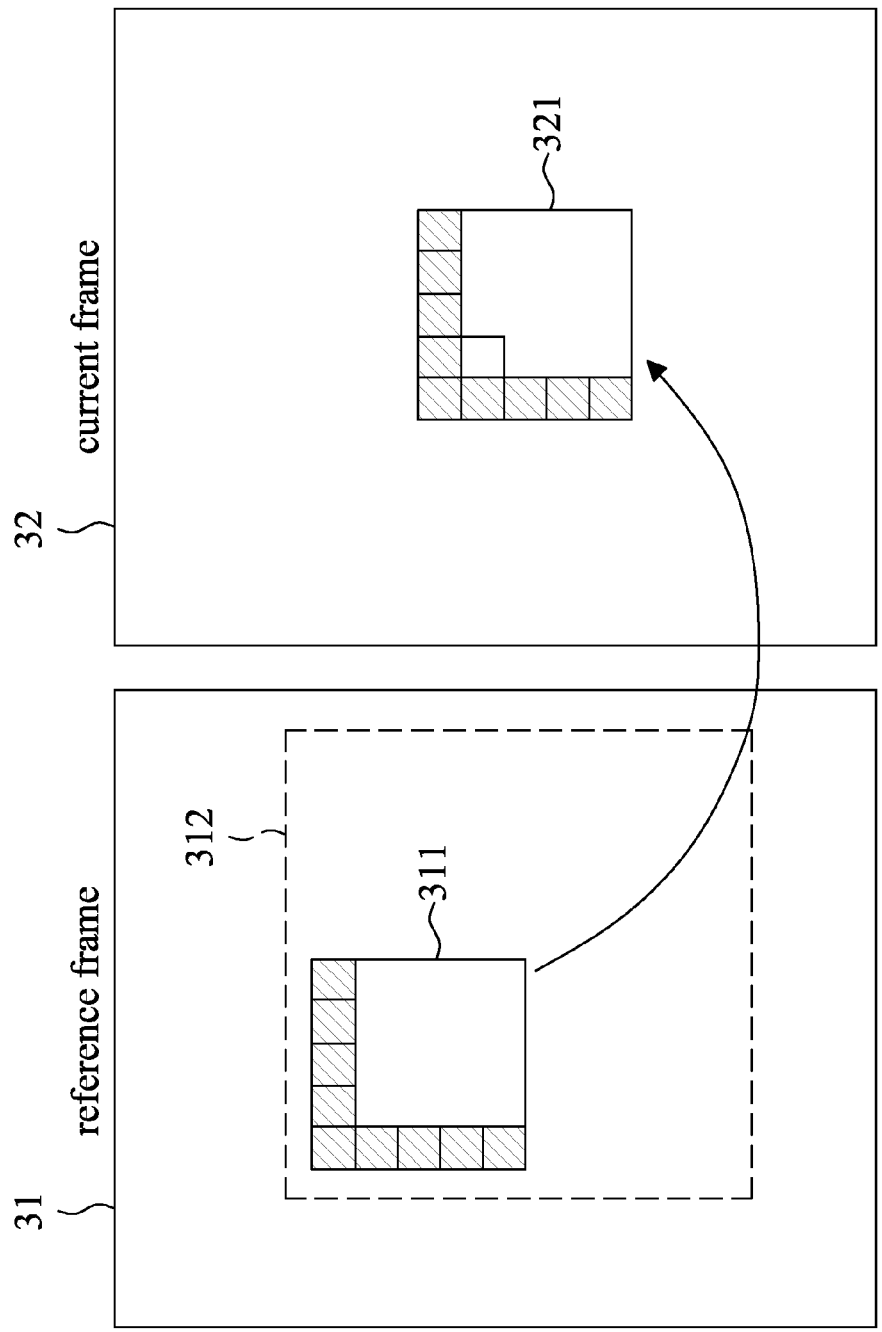

FIG. 3 shows a schematic view of the comparison of a motion estimation module according to the present disclosure. Referring to FIG. 1 to FIG. 3, the motion estimation module 12 is used for selecting a plurality of neighbor pixels outside of left part and top part of the predetermined block 321 according to the predetermined block 321 of the current frame 32, and is used for comparing with a plurality of corresponding neighbor pixels outside of left part and top part of a corresponding predetermined block 311 of a reference frame 31 to determine whether the corresponding predetermined block 311 of the reference frame 31 is copied to the predetermined block 321 of the current frame 32. In an embodiment, if mode 0 is selected, the predetermined block 321 is a 4×4 matrix including 16 pixels, and there are 9 neighbor pixels outside of left part and top part of the predetermined block 321. Similarly, there are 9 neighbor pixels outside of left part and top part of the corresponding predetermined block 311. If the difference between the sum of the pixel values for the 9 neighbor pixels outside of left part and top part of the predetermined block 321 and the sum of the pixel values for 9 neighbor pixels outside of left part and top part of the corresponding predetermined block 311 is within a predetermined value, the corresponding predetermined block 311 of the reference frame 31 can be copied to the predetermined block 321 of the current frame 32.

The reference frame 31 can be a neighbor frame before the current frame 32 or a neighbor frame after the current frame 32. The motion estimation module 12 can proceed to compare within a search range 312 (shown in the dotted line of FIG. 3) of the reference frame 31 to determine a candidate block. The difference between the sum of the pixel values for the 9 neighbor pixels outside of left part and top part of the predetermined block 321 and the sum of the pixel values for 9 neighbor pixels outside of left part and top part of the candidate block in the search range 312 is fewest. Then, the candidate block in the search range 312 of the reference frame 31 can be copied to the predetermined block 321 of the current frame 32

The mode further comprises a comparing order, and the motion estimation module 12 proceeds to compare according to the comparing order. In an embodiment, if mode 0 is selected, the motion estimation module 12 proceeds to compare only the predetermined block of the mode 0. If mode 3 is selected, the motion estimation module 12 proceeds to compare the predetermined block of the mode 0 firstly, then proceeds to compare the predetermined blocks of the mode 1, 2 and 3 in sequence, and a best match block is selected.

Using the mode decision module and the motion estimation module, the complexity of the decoder of the disclosure can greatly be reduced, and the performance of the decoder can be improved. Furthermore, according to the required complexity and resolution, the mode decision module can flexibly determine different mode so that the motion estimation module can flexibly proceed to estimate to further improve the performance.

Figure 4:
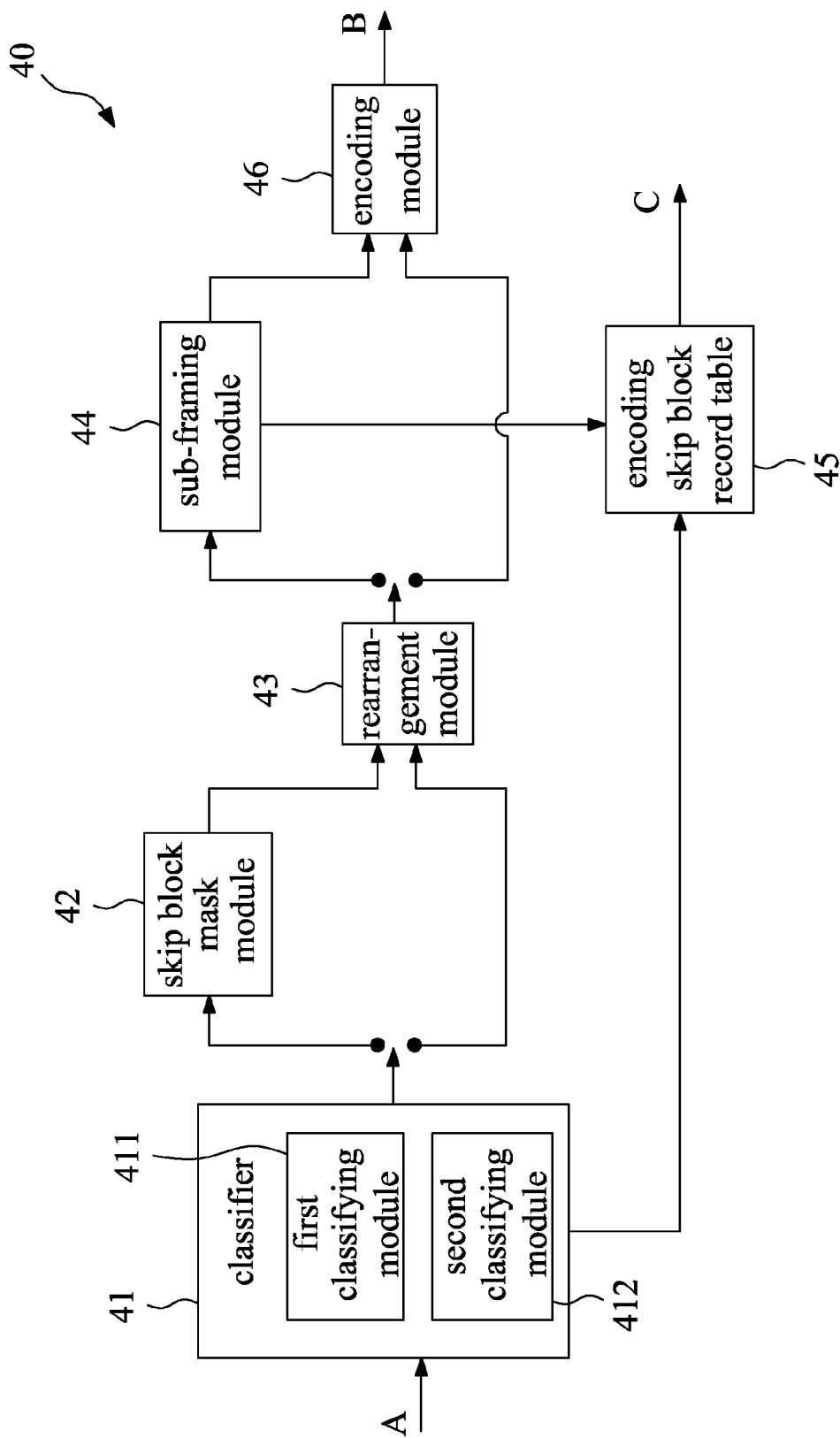
Figure 5:
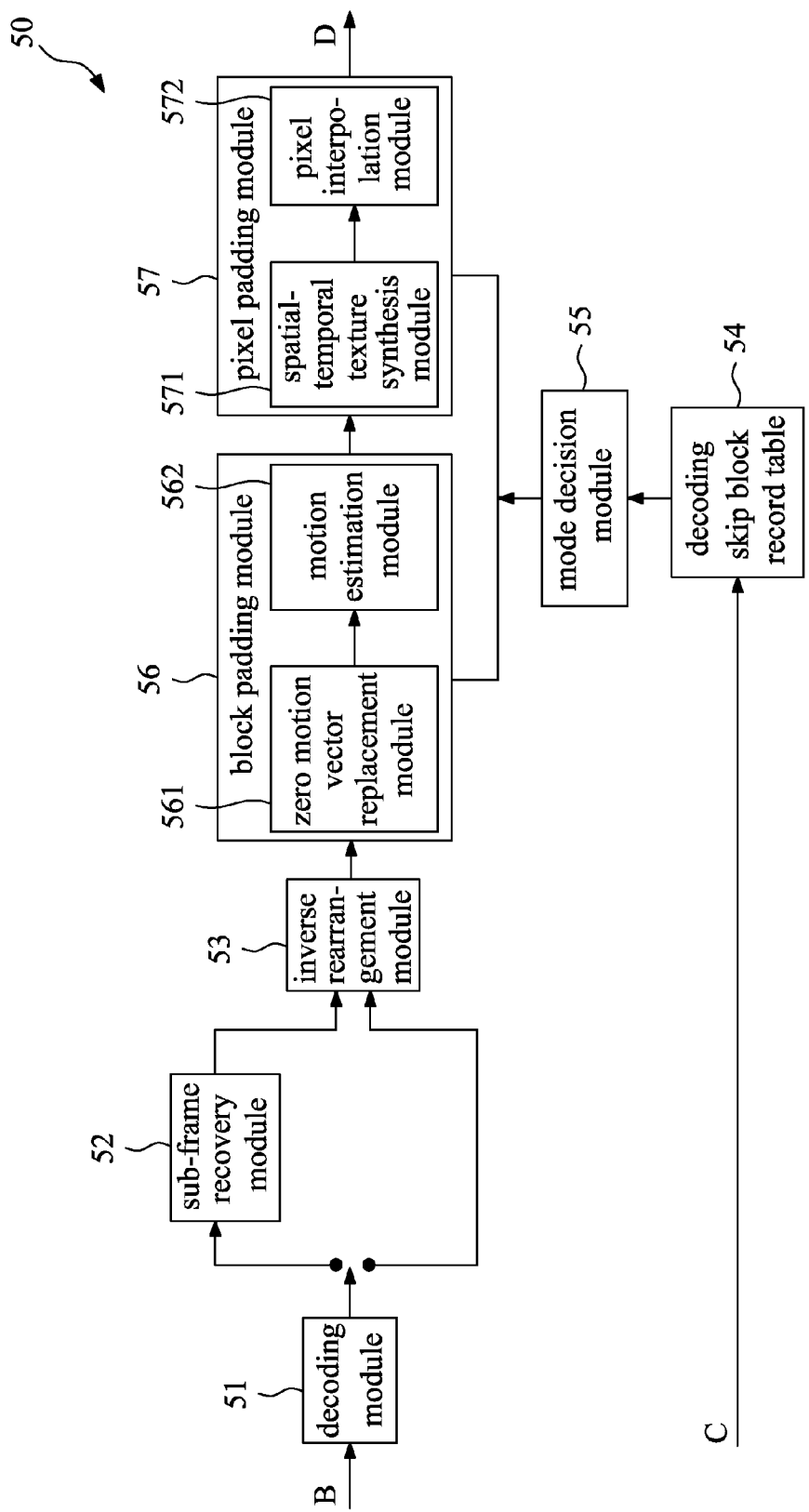

FIG. 4 shows a schematic view of an encoder of the light-weight video coding system according to the present disclosure. FIG. 5 shows a schematic view of a decoder of the light-weight video coding system according to the present disclosure. Referring to FIG. 4 and FIG. 5, the light-weight video coding system includes an encoder 40 and a decoder 50. The encoder 40 includes: a classifier 41, a skip block mask module 42, an encoding skip block record table 45 and an encoding module 46.

The classifier 41 includes a first classifying module 411 and a second classifying module 412. The first classifying module 411 is used for obtaining at least one zero motion block. In an embodiment, the first classifying module 411 can be a sum of absolute differences (SAD) classifying module to calculate the sum of absolute differences between the value of the pixels in a block of the current frame and the value of the pixels in a corresponding block of the reference frame. If the sum is smaller than a predetermined value, it means that the pixels in the block of the current frame are similar to the pixels in the corresponding block of the reference frame, and the block of the current frame is a zero motion block. Thus, the zero motion block of the current frame can be obtained.

The second classifying module 412 is used for obtaining at least one low motion block. In an embodiment, the second classifying module 412 can be a direct current (DC) classifying module to calculate the difference between the average value of the pixels in a block of the current frame and the average value of the pixels in a corresponding block of the reference frame. If the average difference is smaller than a predetermined value, it means that the difference between the pixels in the block of the current frame and the pixels in the corresponding block of the reference frame is not large, and the block of the current frame is classified to a low motion block. Thus, the low motion block of the current frame can be obtained.

The skip block mask module 42 is used for masking portion of an image information (A) to be at least one skip block according to the at least one zero motion block and the at least one low motion block, non-masking portion of the image information is at least one non-skip block. In an embodiment, the image information can be the information of the current frame. The at least one skip block includes the at least one zero motion block and the at least one low motion block, it means that the at least one zero motion block and the at least one low motion block can be obtained from the reference frame, and can be skipped when encoding.

The encoding skip block record table 45 is used for recording the at least one skip block. The encoding module 46 is used for encoding the at least one non-skip block to be an encoded image information (B). The encoding module 46 can use an encoding standard, for example H.263+, H.264/AVC, MPEG-2, MPEG-4, JPEG or JPEG-2000 etc., but the encoding standard is not limited to the above encoding standard.

The decoder 50 includes: a decoding module 51, a decoding skip block record table 54, a mode decision module 55, a block padding module 56 and a pixel padding module 57. The decoding module 51 is used for decoding the encoded image information (B) to be at least one non-skip block. The decoding skip block record table 54 is used for receiving the information (C) of the encoding skip block record table 45.

The mode decision module 55 is used for selecting a mode according to the decoding skip block record table 54, and is used for selecting at least one predetermined block of the current frame. The predetermined block includes a plurality of pixels. The mode decision module 55 can refer to the mode decision module 11 in FIG. 1 and the description of FIG. 2, and will not be described in detail.

The block padding module 56 includes a zero motion vector replacement module 561 and a motion estimation module 562. The zero motion vector replacement module 561 is used for replacing the at least one zero motion block of the current frame by at least one corresponding zero motion block of the reference frame. As stated in the above, since the pixels in the zero motion block of the current frame are the same as the pixels in the corresponding zero motion block of the reference frame, the zero motion block of the current frame 32 can be replaced by the corresponding zero motion block of the reference frame 31.

The motion estimation module 562 is used for selecting a plurality of neighbor pixels outside of left part and top part of the predetermined block according to the at least one low motion block and the predetermined block of the current frame, and is used for comparing with a plurality of corresponding neighbor pixels outside of left part and top part of a corresponding predetermined block of the reference frame to determine whether the corresponding predetermined block of the reference frame is copied to the predetermined block of the current frame. In an embodiment, the motion estimation module 562 proceeds to compare within a search range of the reference frame according to the at least one low motion block. Since the low motion block of the current frame is corresponding to the low motion block of the reference frame, the block being similar to or same as the low motion block of the current frame can be obtained in the search range of the reference frame so as to reduce the complexity of the decoder. The motion estimation module 562 can refer to the motion estimation module 12 in FIG. 1 and the description of FIG. 2 and FIG. 3, and will not be described in detail.

The pixel padding module 57 is used for padding at least one remainder pixel of the current frame. All the zero motion blocks and portion of the low motion blocks are padded by the block padding module 56, the other low motion block and the at least one remainder pixel can be padded by the pixel padding module 57. The pixel padding module 57 includes a spatial-temporal texture synthesis module 571 and a pixel interpolation module 572.

Figure 6:
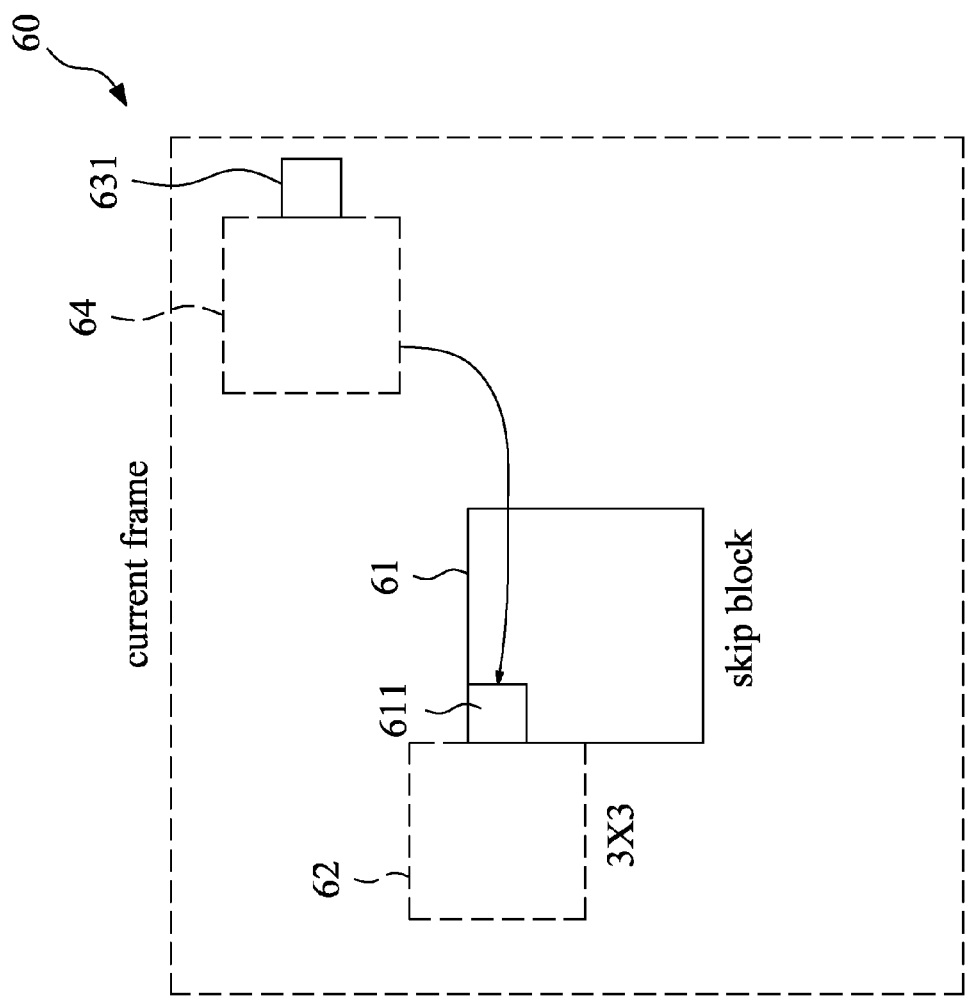

FIG. 6 shows a schematic view of the comparison of a spatio-temporal texture synthesis module according to the present disclosure. Referring to FIG. 5 and FIG. 6, the spatial-temporal texture synthesis module 571 is used for selecting a template block 62 outside of left part of the remainder pixel 611 in the skip block 61 of the current frame 60, and is used for comparing with a match block 64 of the current frame 60 or the reference frame to determine whether a candidate pixel 631 of the match block 64 is pasted to the remainder pixel 611. In an embodiment, the skip block 61 is a 4×4 matrix, and the template block 62 and the match block 64 are 3×3 matrixes.

The pixel interpolation module 572 is used for selecting a plurality of selection pixels outside of the at least one skip block according to the remainder pixel of the at least one skip block of the current frame, and for averagely calculating the selection pixels to obtain the remainder pixel. In an embodiment, the pixel interpolation module 572 is used for selecting the neighbor selection pixels outside of the at least one skip block, and for averagely calculating the interpolation value of the neighbor selection pixels to obtain the remainder pixel. Therefore, the decoder 50 can obtain the information (D) of the current frame.

The encoder 40 further comprises a rearrangement module 43 for rearranging the at least one non-skip block by new order. The decoder 50 further comprises an inverse rearrangement module 53 for recovering the order of the at least one non-skip block.

The encoder 40 further comprises a sub-framing module 44 for reducing the size of the current frame, for example ½, ¼ or several segments of the current frame. The decoder 50 further comprises a sub-frame recovery module 52 for recovering the size of the current frame.

After experiment, the complexity of the decoder of the light-weight video coding system can greatly be reduced, and the total performance of the light-weight video coding system can be improved. Furthermore, according to the required complexity and resolution, the mode decision module can flexibly determine different mode so that the motion estimation module can flexibly proceed to estimate to further improve the performance.

While several embodiments of the present disclosure have been illustrated and described, various modifications and improvements can be made by those skilled in the art. The embodiments of the present disclosure are therefore described in an illustrative but not in a restrictive sense. It is intended that the present disclosure should not be limited to the particular forms as illustrated and that all modifications which maintain the spirit and scope of the present disclosure are within the scope defined in the appended claims.

What is claimed is:
1. A light-weight video coding system, comprising:
an encoder, comprising:
a classifier that obtains at least one zero motion block, and obtains at least one low motion block;
a skip block mask masks a portion of an image information to be at least one skip block according to the at least one zero motion block and the at least one low motion block, a non-masking portion of the image information being at least one non-skip block;
an encoding skip block record table records the at least one skip block; and
encodes the at least one non-skip block to be an encoded image information;
a decoder
decodes the encoded image information to be at least one non-skip block;
a decoding skip block record table receives the encoding skip block record table;
a mode decision module selects a mode according to the decoding skip block record table, and selects at least one predetermined block of a current frame, the predetermined block comprising a plurality of pixels;
a zero motion vector replacement module; and a motion estimation module,
wherein the zero motion vector replacement module replaces the at least one zero motion block of the current frame by at least one corresponding zero motion block of a reference frame;
wherein the motion estimation module
selects a plurality of neighbor pixels outside of left part and top part of the predetermined block according to the at least one low motion block and the predetermined block of the current frame,
compares the plurality of neighbor pixels outside of left part and top part of the predetermined block according to the at least one low motion block and the predetermined block of the current frame with a plurality of corresponding neighbor pixels outside of left part and top part of a corresponding predetermined block of the reference frame and
determines whether the corresponding predetermined block of the reference frame is copied to the predetermined block of the current frame; and
a pixel padding module pads at least one remainder pixel of the current frame.

2. The light-weight video coding system according to claim 1, wherein the encoder rearranges the at least one non-skip block by new order; and the decoder recovers the order of the at least one non-skip block.

3. The light-weight video coding system according to claim 1, wherein the encoder reduces the size of the current frame; the decoder recovers the size of the current frame.

4. The light-weight video coding system according to claim 1, wherein the pixel padding module selects a template block outside of left part of the remainder pixel of the current frame, and compares the template block outside of left part of the remainder pixel of the current frame with a match block of the current frame or the reference frame, and determines whether a candidate pixel of the match block is pasted to the remainder pixel.

5. The light-weight video coding system according to claim 1, wherein the pixel padding module selects a plurality of selection pixels outside of the at least one skip block according to the remainder pixel of the at least one skip block of the current frame, and obtains the remainder pixel by averaging the plurality of selection pixels.

6. The light-weight video coding system according to claim 1, wherein the mode further comprises a comparing order, and the motion estimation module compares the plurality of neighbor pixels outside of left part and top part of the predetermined block according to the comparing order of the at least one low motion block and the predetermined block of the current frame with the plurality of corresponding neighbor pixels outside of left part and top part of the corresponding predetermined block of the reference frame.

7. The light-weight video coding system according to claim 1, wherein the motion estimation module compares the plurality of neighbor pixels outside of left part and top part of the predetermined block, and determines within a search range of the reference frame a candidate block according to the at least one low motion block and the predetermined block of the current frame with the plurality of corresponding neighbor pixels outside of left part and top part of the corresponding predetermined block of the reference frame.

8. A decoder for a light-weight video coding system, comprising:
a mode decision module that selects a mode, and selects at least one predetermined block of a current frame according to the mode, the predetermined block comprising a plurality of pixels; and
a motion estimation module that selects a plurality of neighbor pixels outside of left part and top part of the predetermined block according to the predetermined block of the current frame, and compares the plurality of neighbor pixels outside of left part and top part of the predetermined block according to the predetermined block of the current frame with a plurality of corresponding neighbor pixels outside of left part and top part of a corresponding predetermined block of a reference frame, and determines whether the corresponding predetermined block of the reference frame is copied to the predetermined block of the current frame.

9. The decoder according to claim 8, wherein the mode further comprises a comparing order, and the motion estimation module compares the plurality of neighbor pixels outside of left part and top part of the predetermined block, and according to a compare order the predetermined block of the current frame with the plurality of corresponding neighbor pixels outside of left part and top part of the corresponding predetermined block of the reference frame.

10. The decoder according to claim 8, wherein the motion estimation module compares the plurality of neighbor pixels outside of left part and top part of the predetermined block, and determines a candidate block according to the predetermined block of the current frame with the plurality of corresponding neighbor pixels outside of left part and top part of the corresponding predetermined block of the reference frame within a search range of the reference frame.

\* \* \* \* \*